R. EICKEMEYER.
APPARATUS FOR PRESERVING BEER, ALE, &c.
No. 82,394. Patented Sept. 22, 1868.
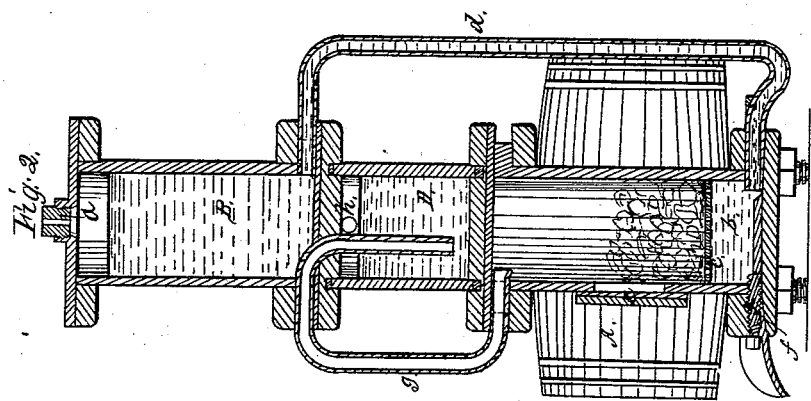
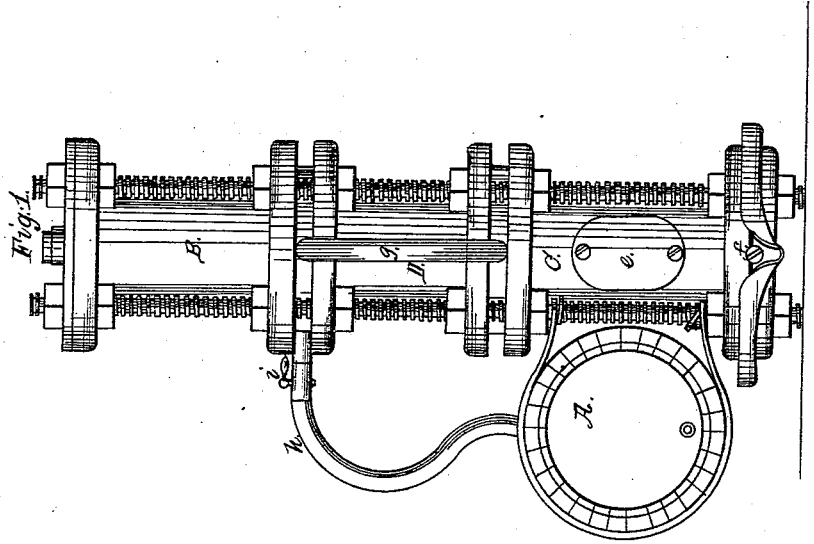

United States Patent Office.

RUDOLPH EICKEMEYER, OF YONKERS, NEW YORK.

Letters Patent No. 82,394, dated September 22, 1868.

IMPROVED APPARATUS FOR PRESERVING BEER, ALE, &c.

*The Schedule referred to in these Letters Patent and making part of the same.*

TO ALL WHOM IT MAY CONCERN:

Be it known that I, RUDOLPH EICKEMEYER, of Yonkers, in the county of Westchester, and State of New York, have invented a new and useful Improvement in the Preservation of Beer and other Perishable Liquids or Substances, of which the following is a full, clear, and exact description, reference being had to the accompanying drawing, forming part of this specification, and in which—

Figure 1 represents an elevation of an apparatus with barrel attached, having its contents under process of treatment according to my invention, and Figure 2 a sectional elevation of the same, viewed at right angles to fig. 1.

Similar letters of reference indicate corresponding parts.

Although applicable to the preservation of other liquids of a perishable character, also fruit and other substances or articles, it will suffice, in this description, mainly to refer to my invention as used in connection with lager-beer, which, it is well known, in being run off from a keg or barrel intermittently, or at intervals of time, spoils, by loss or escape of the carbonic-acid gas contained in the beer, and by the oxidation consequent upon the admission of air to take the place of the beer drawn off.

My invention consists in a connection or combination of the vessel which contains the article or liquid to be preserved, with a chamber or reservoir charged with carbonic-acid gas, in such manner as that the vessel containing the said article or liquid, or vacant space in said vessel, is kept filled with carbonic acid as rapidly as the contents of the vessel absorb the carbonic acid, or as the contents of said vessel are drawn off.

And my invention also includes such an arrangement or combination and construction of a carbonic-acid-gas-generating apparatus, for connection with the perishable articles or liquids contained in a separate vessel, for charging its contents and vacant space, as described, as that the height of the column of acid used in generation of said gas keeps up a pressure on said gas, for expulsion of the same in a regular manner, into the vessel, the contents of which are required to be preserved, and automatically maintains the generation and supply of said gas.

Likewise, the invention covers a certain combination or arrangement of parts or devices for effecting the above-named result or results, under a washed or purified condition of the gas.

Referring to the accompanying drawing, which shows a barrel or cask, A, in connection with a carbonic-acid-gas-generating apparatus, B is a sulphuric or other acid-reservoir, arranged to occupy an upper and elevated position in the apparatus, and relatively to the cask or vessel to be charged; also provided with a charging-aperture and stopper, $a$.

Said apparatus, which, in its general action, is automatic, furthermore consists of a gas-generating chamber, C, arranged to occupy a base or lower position relatively to the acid-reservoir B, such two chambers or reservoirs also having combined with them a gas-washer or washing-chamber, D. Connecting the acid-reservoir B, from or near its base, with the gas-generator C or space $b$, lying below a perforated bottom, $c$, to the generator, on which bottom the carbonate of soda or other suitable substance rests, is a pipe, $d$, that serves, by the superincumbent weight or pressure of the acid, to supply, in an automatic manner, the latter, and keep up its contact with the carbonate of soda, to effect the generation of the gas within the chamber C; also, by the superincumbent weight or pressure of the column of acid, to expel the gas as generated, the pressure of the gas operating, in a reverse direction, to limit and control the supply of the acid.

The carbonate of soda is or may be inserted within the chamber C through a door, $e$, while refuse matter may, from time to time, be drawn off from the space $b$, by removing a plug, $f$. The gas-washer D has the gas conveyed to it from the generator C by a pipe, $g$, while the washed gas is passed, by a pipe, $h$, opening in the washer above the water, to the cask or barrel A, the supply being turned on or off, as required, by a cock, $i$.

From this description, it will be seen that the beer or other liquid in the keg, cask, or barrel, takes up, by its power of absorption, carbonic-acid gas, to secure to it the preservation of its natural qualities, and to make up any deficiency in the volume of such gas within the liquid, whether as due to it originally, or as arising from exposure to the atmosphere in drawing off the liquid, and that the vacant space above the liquid is constantly kept filled with said gas. This is effected by the connection of the keg, cask, or barrel with a carbonic-acid-gas-reservoir, or generating and supplying-apparatus.

Also, it will be seen that, by the special construction of the apparatus, as described, or arrangement of the acid-reservoir, gas-generator, and washing-chamber or vessel, the cleansed or purified gas is supplied to the keg, cask, or barrel, not only in an automatic and regular manner, but the gas forcibly expelled by the pressure of the column of the acid into the vessel, the contents of which are required to be preserved.

In the preservation of fruit, a like operation is observed, only substituting the can containing the fruit for the cask containing the beer or liquid, and repeating the operation till the atmospheric air, or major portion of it, is expelled from the can or its contents, by the charging, under repeated fillings, with gas, subject to intermissions, for escape of the air of the can or its contents.

What is here claimed, and desired to be secured by Letters Patent, is—

1. The process, substantially as herein described, of preserving beer or other perishable liquids or substances, by the connection or combination of the vessel containing the same with a carbonic-acid-gas-generating apparatus or reservoir, in such manner as that the contents of said vessel, or vacant space of the latter, is or are kept constantly charged with said gas, in a regular and automatic manner, as rapidly as said contents absorb the gas, or contents of the vessel are drawn off, substantially as specified.

2. The arrangement, in connection with the vessel containing the liquid or article requiring to be preserved, of an upper acid-reservoir, B, and lower gas-generator, C, for supply, in a regular and automatic manner, of the gas to said vessel, and whereby the gas is forcibly expelled into the latter by the superincumbent weight or pressure of the column of liquid acid, essentially as herein set forth.

3. The arrangement of the said reservoir B, gas-generator C, and washer D, in an apparatus for supplying, in an automatic manner, carbonic-acid gas to the vessel, or its contents requiring to be preserved, substantially as shown and described.

R. EICKEMEYER.

Witnesses:
 A. LE CLERC,
 A. KINNIER.